April 15, 1952     A. J. SALG     2,593,199
ARTIFICIAL BAIT
Filed Feb. 27, 1950
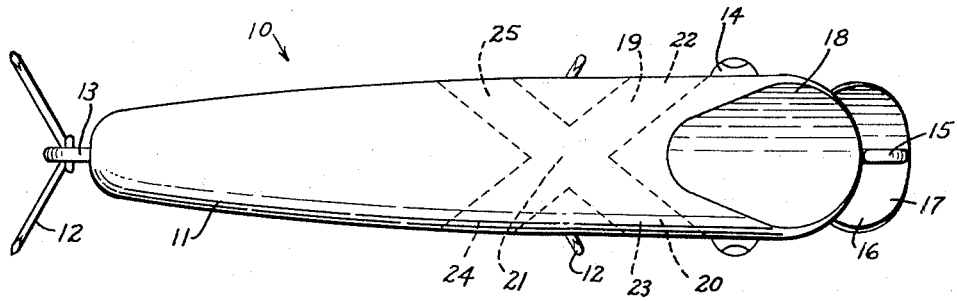
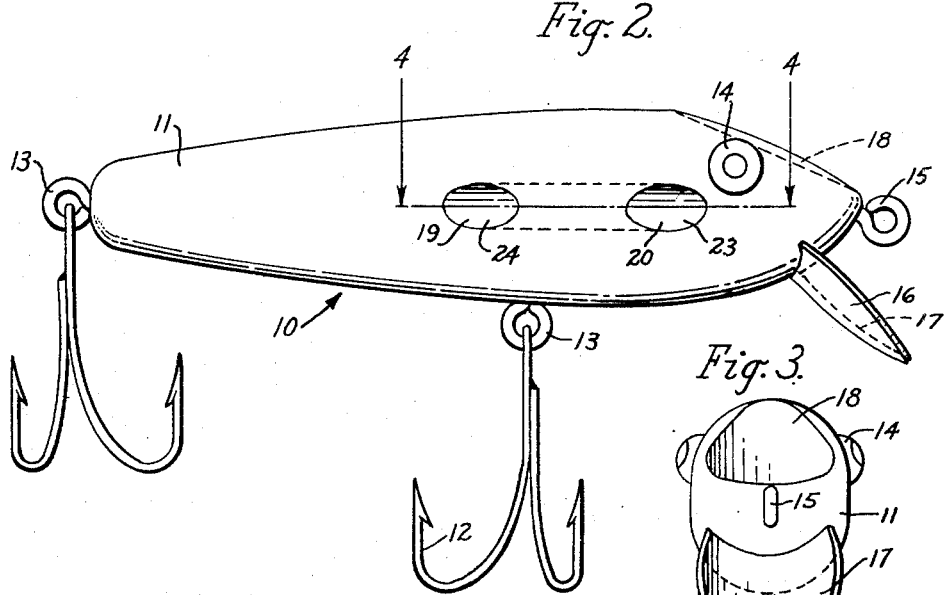
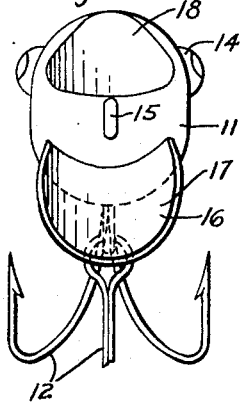
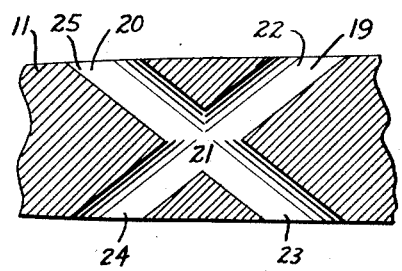
INVENTOR.
ARNOLD J. SALG
BY
*G. H. Braddock*
ATTORNEY.

Patented Apr. 15, 1952

2,593,199

UNITED STATES PATENT OFFICE 2,593,199

ARTIFICIAL BAIT

Arnold J. Salg, Shakopee, Minn.

Application February 27, 1950, Serial No. 146,436

1 Claim. (Cl. 43—42.06)

This invention has relation to an artificial bait of the kind which consists of a plug constituting a body member of the artificial bait and fish hooks supported on the plug.

It is well known to fishermen that the success of an artificial bait depends to a substantial extent upon its motion through the water as it is pulled along by a fish line. The invention presents a fish lure which has a motion through the water closely approximating the motion of a small fish.

An artificial bait made according to the present invention will have a side to side movement, or weave, even when propelled through the water at extremely slow rates of speed. Also, artificial bait of the character as herein presented will be caused to take sudden darting movements in random directions when a sudden tug or jerk is applied to a fish line propelling the bait.

In the accompanying drawing forming a part of this specification.

Fig. 1 is a top plan view of an artificial bait made according to the invention;

Fig. 2 is a side elevational view of the bait;

Fig. 3 is a front elevational view; and

Fig. 4 is a sectional view of the body of the bait, taken on line 4—4 in Fig. 2.

The artificial bait 10 includes a plug 11 of wood, plastic, or other material having specific gravity less than that of water. Fish hooks 12, 12 are attached to the plug 11, as at 13, 13. Fish eyes 14, 14 are situated at an upper forward portion of the plug 11 to give the appearance of a minnow or other small fish. A closed loop 15 is provided for attaching the artificial bait to a fish line.

In the disclosed embodiment of the invention, a scoop 16 is provided with a forwardly facing, downwardly and forwardly extending, concave surface 17, and a forward upper portion of the plug 11 is provided with a similarly facing surface 18.

A pair of intersecting horizontal passageways 19 and 20 extend obliquely through the plug body 11 as best disclosed in Fig. 4. Portions of these passageways in front of an area of intersection 21 are denoted 22 and 23, respectively, and portions of said passageways which are at the rear of said area of intersection are denoted 24 and 25, respectively. Entrances to the portions 22 and 23 are ahead of and exits from the portions 24 and 25 are behind the center of mass.

In operation, a leader of a fish line is connected to the closed loop 15. The artificial bait is then cast into the water through the instrumentality of a casting rod and reel supporting the fish line.

As the fish line is reeled back to the casting rod, the artificial bait is drawn through the water. The surfaces 17 and 18 are so disposed as to force the artificial bait down beneath the surface of the water as it is propelled forwardly. A similar result could be accomplished by omitting surfaces such as 17 and 18 and constructing the bait of material causing it to have specific gravity equal to or greater than the specific gravity of water.

As the artificial bait is propelled through the instrumentality of the fish line, it will have a weaving or side to side motion in the water. In other words, as the fish line pulls the bait through the water, said bait will both head and move alternately in directions to the right and to the left of its mean path toward the location of the casting rod. This will be so even though the bait is propelled at extremely slow rate of speed. Various means have been employed in the past in attempt to impart side to side weaving motion to artificial bait as they are propelled through water. These devices, however, depend for their effectiveness on reeling-in fast enough often to discourage or outdistance a fish following the bait. An artificial bait made according to the present invention has been found to have considerable weaving action when propelled at rate of speed considerably less than that necessary satisfactorily to operate artificial bait heretofore of commerce.

As the bait starts to move through the water after it has been cast, the initial pull of the fish line, or any slight disturbance in the water, will cause the bait to swing horizontally so that the pull is not in direct line with the longitudinal axis of the artificial bait. Assuming that the initial pull comes from the right of the longitudinal axis as disclosed in Fig. 3, the bait will be moved through the water momentarily to bring the force of the water against the side surface of the bait to the right in said Fig. 3. The front portion 22 of the passageway 19 will be open to the force of the flow to a greater extent than will the front portion 23 of the passageway 20. This will result in a flow of water into and through the portion 22 of the passageway 19. The amount of water flowing into or out of the portions 23, 24 and 25 at any moment with respect to that flowing into the portion 22 will be determined by the speed at which the bait is being propelled and the relation of the outlets of the portions 22, 23, 24 and 25 to the direction of movement. It is an observed fact that when the flow is directed into the entrance portion 22, for example, flow outward through the other portions of both of the passageways 19 and 20 causes the bait to be swung about its center of mass in direction tending to cause the passageway 19 to be alined with the mean path of the bait. Eventually, the pull of the fish line and the force of the water against the side of the bait to which the entrance portion 22 is open overbalance the forces acting inside the passageways 19 and 20 and the bait swings back toward and past its position where its longitudinal axis is alined with its mean path. When this happens, the front portion 23 of the passageway 20 will be open to the force of the flow to a greater extent than will be the front portion 22 of the passageway 19. This will result in flow of water into and through the portion 23 of the passageway 20. The amount of water flowing into or out of the portions 22, 24 and 25 at any moment with respect to that flowing into the portion 23 will be determined by the speed at which the bait is being propelled and the relation of the outlets of the portions 22, 23, 24 and 25 to the direction of movement. When the flow is directed into the entrance portion 23, flow outward through the other portions of both of the passageways 19 and 20 causes the bait to be swung about its center of mass in direction tending to cause the passageway 20 to be alined with the mean path of the bait. As the pull of the fish line and the force of the water against the side of the bait to which the entrance portion 23 is open overbalance the forces acting inside the passageways 19 and 20, the bait swings back toward and past its position where its longitudinal axis is alined with its mean path.

This alternate swinging from side to side by the bait, as it moves along its mean path from the point where it hit the water to the location of the casting rod, will be continuous as long as the fish line is kept moving and will take place regardless of the rate of speed at which the line moves the bait.

It will be seen that when, for example, the side of the bait to which the entrance portion 22 is open is partially turned toward the location of the casting rod, the principal flow inside the plug will be along the passageway 19. This flow will have a stabilizing effect and will tend to allow the plug to travel farther to the opposite side of the mean path of its motion than would be the case if the plug were free to turn without an inertia effect caused by the water in the plug.

In order to simulate the movement of a minnow, or other live bait, it is advantageous to have the artificial bait make darting movements as it moves along its mean path. This movement is desired by fishermen when they make sudden tugs on the fish line by jerks or sudden movements of its held end. Heretofore, jerks or sudden movements on fish lines have caused artificial bait available prior to the present invention to move or dart only in the direction of the tug on the fish lines. Similar action by a fisherman on a fish line having a bait made according to the invention will cause the bait to dart in the direction in which the bait is headed at the time of the tug on the line, whether this be toward the direction of the tug on the line or to the left or right of that direction. When a tug is made on the line while the bait is directed toward right or left of its mean path, the inertia effect of the water flowing in the passageways will oppose the turning torque and at the same time not appreciably affect the increased forward movement of the bait. As the bait moves through the water, the water passing through the passageways 19 and 20 can be considered substantially at rest. The surfaces of the interior of the passageways 19 and 20 move around this water, confine it briefly, change its direction slightly and then move away from it without any more "drag" by the water than that occasioned by the forces which cause the relatively light plug to be swung from side to side. If, however, a force acting externally on the bait, as, for example, the application of a sudden tug by the fish line, is applied to tend to turn the plug in a horizontal plane, the water trapped by the sides of the passageways 19 and 20, being substantially at rest and having specific gravity greater than that of the plug, will produce an inertia effect which will have to be overcome before the bait can turn in response to the tug on the fish line. Since this effect will not be instantaneously overcome, the result will be that the bait will be free to move at accelerated speed in the direction in which headed when the tug is made. The bait will not turn appreciably from its path for the duration of the sudden tugging force.

What is claimed is:

An artificial bait consisting of an elongated buoyant plug having a forward end, vertical side surfaces disposed substantially parallel to each other and top and bottom sides, a fish hook supported on said bottom side of said plug for causing said buoyant plug to lie in the water with said bottom side down and a closed loop attached to said forward end of said plug for supporting a fishing line, said plug having a pair of uniform, straight, intersecting passageways extending obliquely therethrough and having axes lying in a single horizontal plane passing through the center of mass of said plug, each passageway having a forward portion open to one of said side surfaces forward of the center of mass of the plug, an alined rear portion open to the opposite one of said side surfaces rearward of the center of mass of the plug and an intersection portion between said forward and rear portions common to both of such passageways.

ARNOLD J. SALG.

REFERENCES CITED

The following references are of record in the file of this patent:

UNITED STATES PATENTS

| Number | Name | Date |
| --- | --- | --- |
| 923,670 | Lockhart | June 1, 1909 |
| 1,099,606 | Larrabee | June 9, 1914 |
| 1,390,458 | Moree | Sept. 13, 1921 |
| 1,609,855 | Bayer | Dec. 7, 1926 |
| 2,167,334 | Hayes | July 25, 1939 |